July 30, 1963 L. KAISER 3,099,178
LATHE
Filed July 28, 1959 4 Sheets-Sheet 1

INVENTOR
LOTHAR KAISER
by Walter S. Bleston
ATTORNEY

July 30, 1963 L. KAISER 3,099,178
LATHE

Filed July 28, 1959 4 Sheets-Sheet 2

INVENTOR
LOTHAR KAISER
by Walter S Blenton
ATTORNEY

July 30, 1963 L. KAISER 3,099,178
LATHE
Filed July 28, 1959 4 Sheets-Sheet 3

INVENTOR
LOTHAR KAISER
by Walter S. Preston
ATTORNEY 3,099,178
LATHE
Lothar Kaiser, Reinach, Aargau, Switzerland, assignor to Maschinenfabrik A.G. Menziken, Menziken, Aargau, Switzerland
Filed July 28, 1959, Ser. No. 829,999
Claims priority, application Switzerland Aug. 12, 1958
6 Claims. (Cl. 82—2)

This invention relates to lathes such as those used for automatic copying.

In such lathes known heretofore the workpiece has as a rule been in the horizontal position. In consequence, there is comparatively little room for the attachment of beds for receiving the main tool holding slides. Since it has not been possible to arrange additional machining slides, because of the space limitation, it has been necessary as a rule to perform roughing and finishing operations with one tool and additional recessing slides if required are generally mounted on a not particularly suitable guideway. Furthermore, where automatic operation is required, the hydraulic equipment for that purpose requires still more space, the machines becoming larger for the same machining length and diameter, that is to say, more floor space is required for their erection.

The present invention aims to eliminate these drawbacks.

According to the invention a lathe has a vertical column. A headstock having at least one vertical working spindle and tailstocks for each spindle are mounted on the column and are arranged so that machining operations are effected vertically. On a separate vertical column are mounted tool holding slides which are vertically movable on the columns.

Where there is more than one working spindle the tool carrying slide columns can be arranged around the headstock bearing column and the headstock bearing column may be rotatable about a vertical axis to carrying the work at any work spindle from one tool carrying slide to the next. It is convenient with such an arrangement to effect a number of operations on one workpiece by setting up a number of tools, one on each of a number of columns, and rotating the work spindles from one station to another for a new operation to be effected.

The construction of the invention thus provides a convenient and closely packed arrangement taking up a good deal less space than would a similar machine in which the headstock and tailstock were mounted so that the maching was effected horizontally. The construction has another advantage in that the cuttings can fall freely away from the machine and do not lie on the machine bed as they do on conventional horizontal lathes.

So that the invention will be clearly understood, some examples in accordance with it will now be described with reference to the accompanying drawings in which.

Figure 1:
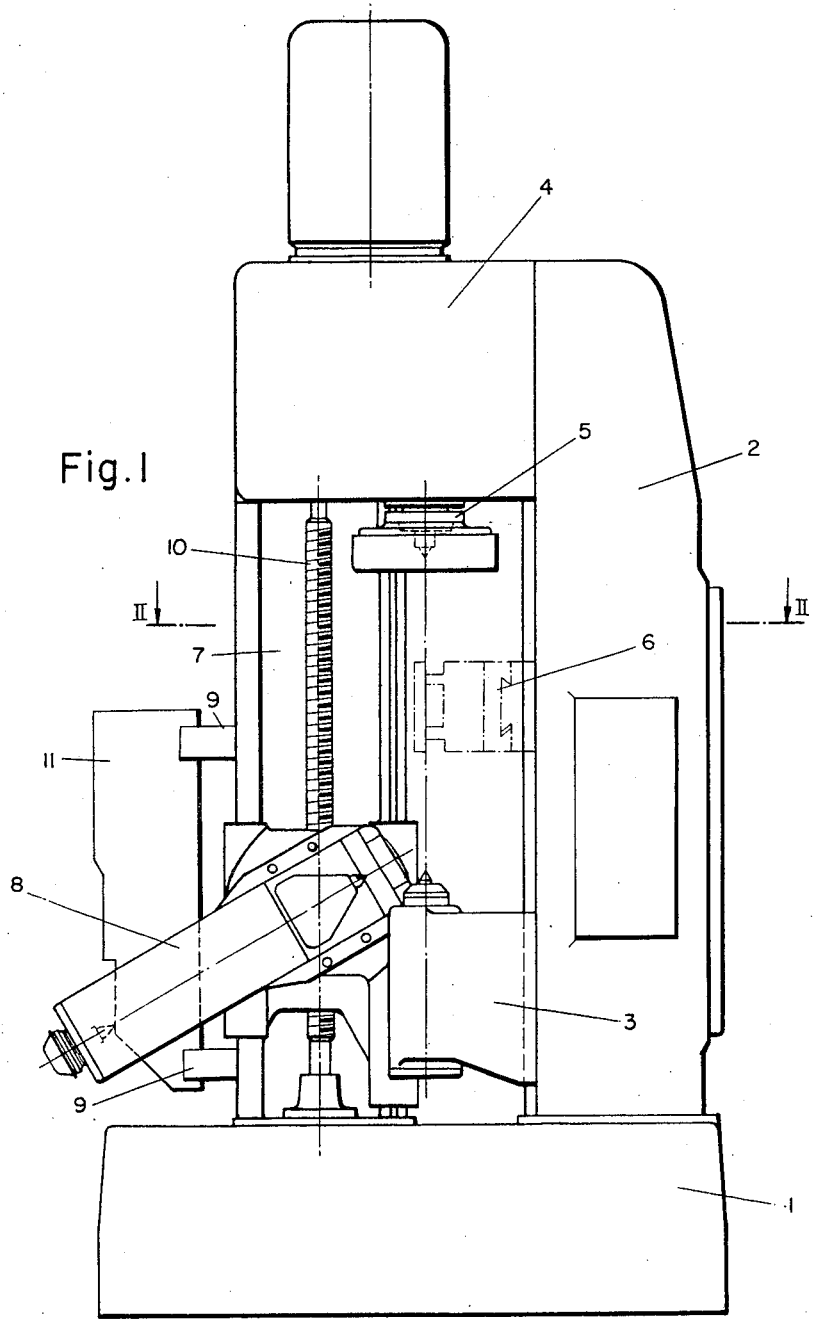
FIG. 1 shows an elevation of an automatic copying lathe with one main slide.
Figure 2:
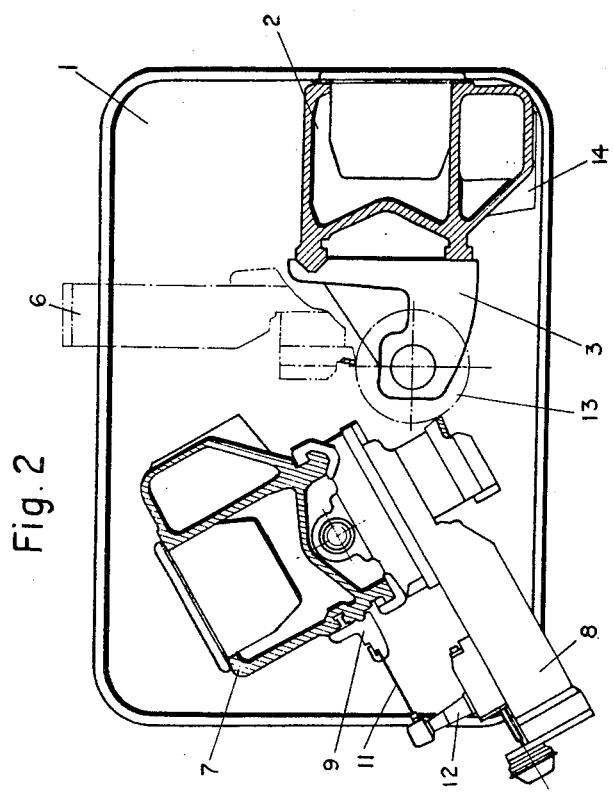
FIG. 2 is a section on the line II—II in FIG. 1.

Referring first to FIGS. 1–2 the machine has a tool holding column 7 with a copying slide 8 mounted on it. The headstock 4 is mounted at the upper end of a main column 2, the relative disposition of column 2 and column 7 being shown in FIG. 2. A base housing 1 carries the vertical column 2 which latter also carries a tailstock 3. It furthermore carries means for the attachment of recessing slides 6, shown in chain lines in FIGS. 1 and 2.

The main drive for headstock spindles 5 and feed mechanisms are accommodated in the headstock 4. The base housing 1, column 2, headstock 4 and column 7 are connected together to form a closed frame and receive in themselves the chip-forming forces set up. The chips fall over the tailstock 3 into the base housing 1, which is constructed as a chip-catching pan. The principal direction of movement of the machining slides 8, which are balanced by counterweights, is towards the headstock.

FIG. 2 shows clearly the relative dispositions at the base housing 1, column 2 for tailstock and headstock, tailstock 3, and the column 7 for the main machining slide 8. On the column 2 is an additional tool holding slide 6 (shown in chain line) which may be used for recessing. A profile or template support 9, profile plates 11 and adjustable tracer slide 12 which control the path of the tool are mounted on column 7. The attachment 14 is for the accommodation of loading and unloading devices.

Figure 3:
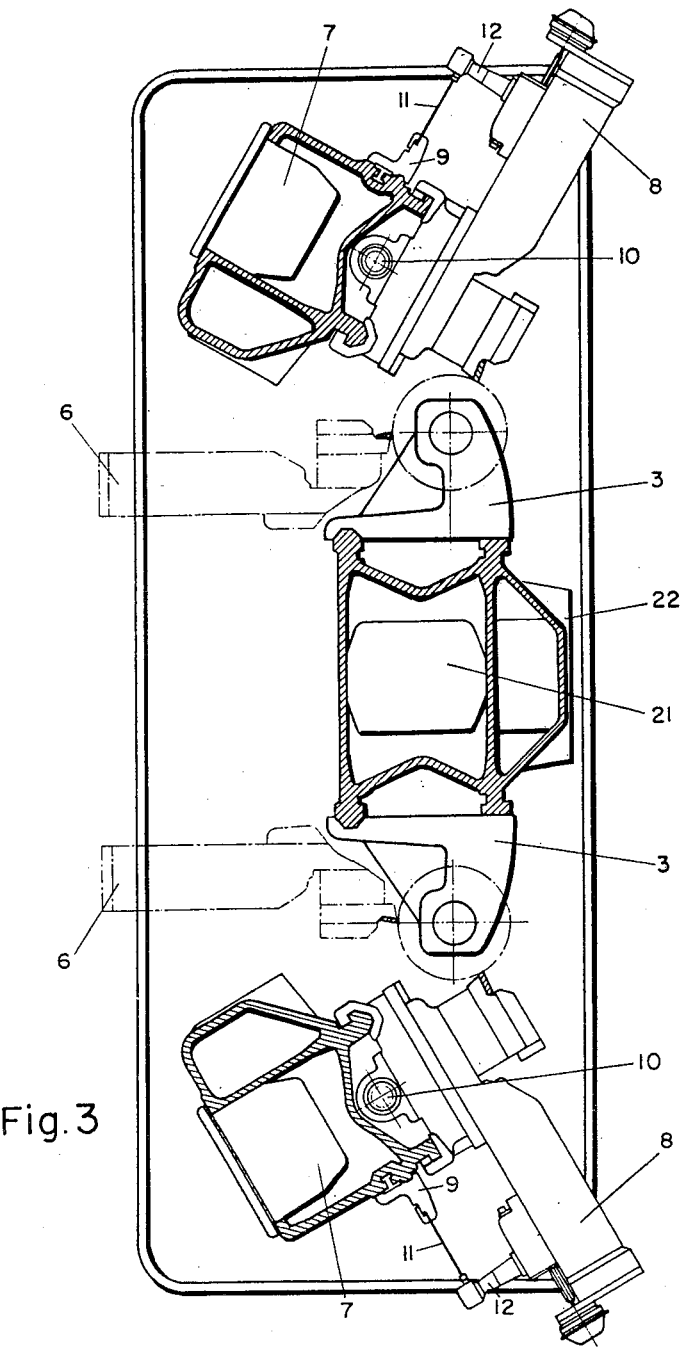
FIG. 3 is a horizontal section through a further constructional example with two main machining slides.

FIG. 3 shows a machine composed of the basic units of FIG. 1. Arranged round the centre column 21, which is provided on two sides with guide surfaces for receiving tailstocks 3 each associated with a work spindle of the headstock 4 (FIG. 1) are two columns 7, on which slide the corresponding tool holding slides 8. The slides operate independently of each other, and the speeds and associated work spindles are likewise independent of each other. Recessing slides 6 may, if desired, also be mounted on the centre column.

The attachment 22 provides for the accommodation of any necessary loading and unloading devices.

Figure 4:
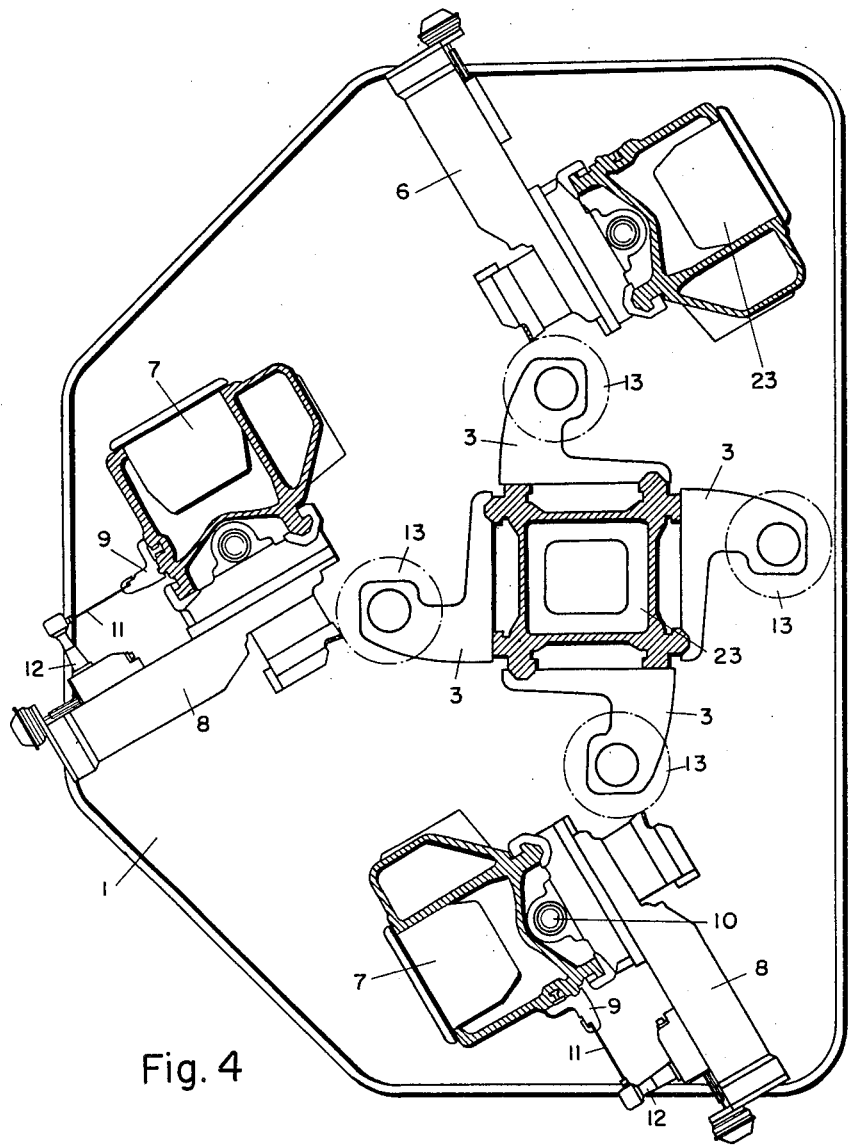
FIG. 4 is a horizontal section through a third constructional example with rotatable main column and three columns for the machining slides.

FIG. 4 shows a machine construction, which is likewise composed of basic units according to FIG. 1. The centre column 23 is rotatably mounted in the base housing 1 and in the headstock. It has four guide surfaces for four tailstocks 3. Arranged round the rotatable centre column are two columns 7 on which are slidably mounted the corresponding machining slides 8.

A column 23 carries one or more independently operating recessing slides 6.

The fourth station is provided for measuring, loading and unloading operations.

Indexing of the rotatable column 23 takes places each time after all the slides have returned to their starting position. The spindle speeds and tool speeds at each station can likewise be adjusted as required.

The base housing 1, columns 7, 23 and a headstock connecting together all three columns together form a frame which receives in itself the forces set up.

The headstock contains the drive for the four independent work spindles. The drive for the main spindles 10 and the feed mechanisms is in the headstock connecting the columns together. The disengagement or engagement of main spindle drive and the respective work spindle on the rotatable column 23 is effected for example by means of a sliding gear which is shifted before the rotation of the column 23.

What I claim is:

1. A lathe comprising a support; a vertical main column mounted on said support; a tailstock secured to said column; a headstock mounted on said column above said tailstock and having a work spindle for rotation of a workpiece held between said tailstock and said work spindle about a vertically extending axis; a tool holding column upwardly extending from said support, said support, columns, and headstock jointly forming a closed frame structure; and a tool slide movable on said tool holding column in a direction substantially parallel to said axis for machining of said workpiece by a tool held by said slide.

2. A lathe as set forth in claim 1, wherein said support constitutes upwardly open pan means for collecting particles machined from a workpiece held between said tailstock and said headstock.

3. A lathe as set forth in claim 1, including fastening means on said main column for fastening a tool slide to the latter column.

4. A lathe comprising a support; a vertical main column mounted on said support; a plurality of tailstocks secured to said column; a headstock mounted on said column above said plurality of tailstocks and having a plurality of rotatable work spindles for simultaneous rotation of a plurality of workpieces held between respective ones of said work spindles and said tailstocks above respective vertically extending axes; a plurality of tool holding columns upwardly extending from said support, said support columns, and headstock jointly forming a closed frame structure; and a tool slide movable on each of said tool holding columns in a direction substantially parallel to a coordinated one of said axes.

5. A lathe comprising a support; a vertical main column mounted on said support; a tailstock secured to said column; a headstock mounted on said column above said tailstock and having a work spindle for rotation of a workpiece held between said tail stock and said spindle about a vertically extending axis; a plurality of tool holding columns upwardly extending from said support, and angularly spaced about said main column, said support, columns, and headstock jointly forming a closed frame structure; and a tool slide movable on each of said tool holding columns in a direction substantially parallel to said axis for machining of said workpiece by tools held by said slides.

6. A lathe as set forth in claim 5, wherein said main column is rotatable on said support about a vertically extending axis for movement of said workpiece between a plurality of work stations coordinated with respective ones of said tool holding columns.

References Cited in the file of this patent

UNITED STATES PATENTS

| | | |
|---|---|---|
| 1,940,403 | Dumser et al. | Dec. 19, 1933 |
| 2,154,326 | Dorin | Apr. 11, 1939 |

FOREIGN PATENTS

| | | |
|---|---|---|
| 420,099 | Italy | Apr. 16, 1947 |